United States Patent
Ganong et al.

(10) Patent No.: US 8,030,821 B2
(45) Date of Patent: Oct. 4, 2011

(54) GENERATOR ROTOR WITH IMPROVED HOLLOW SHAFT

(75) Inventors: Scott R. Ganong, Stillman Valley, IL (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 220 days.

(21) Appl. No.: 12/436,161

(22) Filed: May 6, 2009

(65) Prior Publication Data

US 2010/0283358 A1    Nov. 11, 2010

(51) Int. Cl.
*H02K 7/00*    (2006.01)

(52) U.S. Cl. ..................... 310/261.1; 29/598

(58) Field of Classification Search .............. 310/75 D, 310/75 R, 80, 83, 261.1; 464/180–183; 409/244; 29/596–598

See application file for complete search history.

(56) References Cited

U.S. PATENT DOCUMENTS

| | | | |
|---|---|---|---|
| 4,545,470 A | 10/1985 | Grimm | |
| 4,997,072 A | 3/1991 | Lapthorne | |
| 5,023,789 A | 6/1991 | Lampe et al. | |
| 5,029,689 A | 7/1991 | Grimm | |
| 5,119,905 A * | 6/1992 | Murray | 184/6.11 |
| 5,121,019 A * | 6/1992 | Pradler | 310/83 |
| 5,174,109 A | 12/1992 | Lampe | |
| 5,325,009 A | 6/1994 | Capion et al. | |
| 5,562,190 A | 10/1996 | McArthur | |
| 5,630,704 A * | 5/1997 | Gilgenbach et al. | 416/134 |
| 6,897,581 B2 | 5/2005 | Doherty et al. | |
| 7,084,522 B2 | 8/2006 | Wobben | |
| 7,131,275 B2 | 11/2006 | Gustafson | |
| 2009/0227416 A1 * | 9/2009 | Kakinami et al. | 477/3 |

* cited by examiner

Primary Examiner — Tran Nguyen
(74) Attorney, Agent, or Firm — Carlson, Gaskey & Olds, PC

(57) ABSTRACT

A generator rotor shaft includes a shaft body extending through a first axial distance, and being hollow. Spline teeth are formed in an inner bore of the hollow shaft body. The ratio of a distance from one end of the hollow body to a remote axial end of the spline teeth and compared to the overall length of the shaft body is between 0.3 and 0.6. A rotor balance assembly, a generator, and a method of forming a generator rotor shaft are also disclosed and claimed.

18 Claims, 3 Drawing Sheets

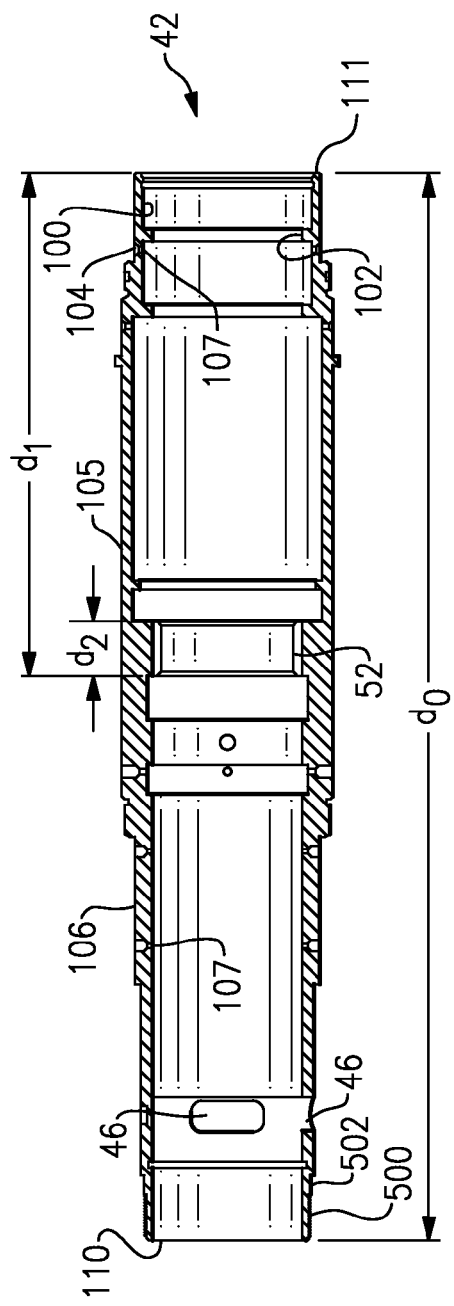
FIG.3A
FIG.3B
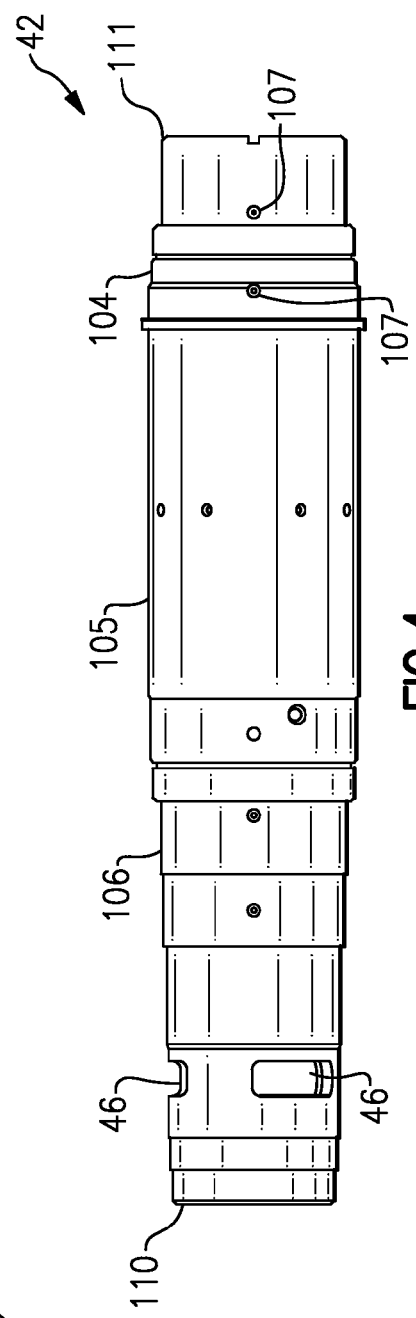
FIG.4

GENERATOR ROTOR WITH IMPROVED HOLLOW SHAFT

BACKGROUND OF THE INVENTION

This application relates to a rotor shaft for use in a generator, wherein the rotor shaft is configured to more efficiently utilize space.

Generators are known and typically include main windings that rotate with a rotor shaft. The rotor shaft is selectively driven to in turn drive the main windings adjacent to a stator, and the rotation of the windings relative to the stator generates electricity.

Modern generators have a number of additional accessories. As an example, an exciter rotor and a permanent magnet rotor are also attached to the rotor shaft. In addition, a rectifier assembly may communicate with the exciter rotor. The rectifier assembly has been mounted within a hollow rotor shaft, however, the exciter rotor has typically been at the end of the shaft. A wire can communicate to the rectifier assembly from the exciter by merely extending around the end of the shaft. The requirement of mounting the exciter rotor at this location provides an undesirable design constraint.

In addition, there have been compromises with regard to the size of the shaft. Typically, a clutch member includes splines that selectively transmit rotation to the rotor shaft. The clutch member must be able to slide such that it can be engaged or disengaged from a drive input. The splines have typically been provided at one end of the rotor shaft. Having the spline connection at either a remote end or an adjacent end of the rotor shaft results in a clutch member that is either too long or too short for many design applications.

Furthermore, generators are typically designed such that they will always operate at a frequency that is below a first natural frequency of the overall assembly. To achieve this goal, it is desirable to increase the rotor outer diameter, and to decrease the distance between supporting bearings for the rotor. However, the requirement of including several operational components has made achieving these goals challenging.

SUMMARY OF THE INVENTION

A generator rotor shaft includes a shaft body extending through a first axial distance, and is hollow. Spline teeth are formed in an inner bore of the hollow shaft body. A ratio of a distance from one axial end of the hollow body to a remote axial end of the spline teeth, compared to the overall length of the shaft body, is between 0.3 and 0.6.

A rotor balance assembly for a generator includes a main winding mounted on an outer periphery of a rotor shaft. The rotor shaft includes a shaft body extending through a first axial distance, and is hollow. Spline teeth are formed on an inner bore of the body. A ratio of a distance from one axial end of the body to a remote axial end of the spline teeth, to the first axial distance, is between 0.4 and 0.5.

A generator includes a stator and a main winding mounted to a rotor shaft for rotation adjacent to the stator. The rotor shaft includes a shaft body extending through a first axial distance, and is hollow. Spline teeth are formed on an inner bore of the body. A ratio of a distance from one end of the body to a remote axial end of the spline teeth, to the first axial distance, is between 0.4 and 0.5.

A method of forming a generator rotor shaft comprises the steps of forming a generally hollow body having an inner bore, and forming a spline teeth within the inner bore at an intermediate location such that a ratio of the entire length of the generally hollow body relative to a length from one end of the hollow body to a remote end of the spline teeth is between 0.3 and 0.6.

These and other features of the present invention can be best understood from the following specification and drawings, the following of which is a brief description.

BRIEF DESCRIPTION OF THE DRAWINGS

FIG. 3A shows a rotor shaft.
FIG. 3B shows a detail of the FIG. 3A view.
FIG. 4 is an outer view of the rotor shaft.

DETAILED DESCRIPTION OF THE PREFERRED EMBODIMENT

Figure 1:
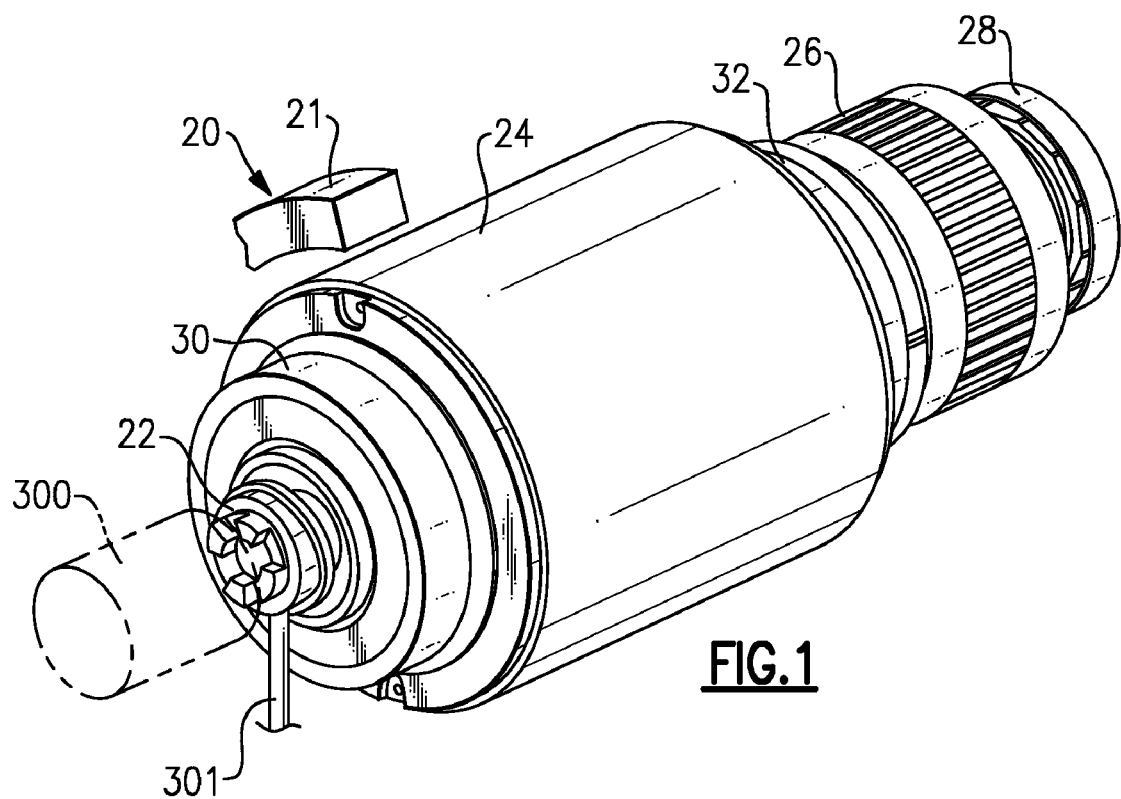
FIG. 1 is a view of a generator.

FIG. 1 shows a generator 20 including a stator 21, shown schematically. A clutch member 22 has teeth that will selectively engage teeth on a drive input 300. The clutch member 22 may also be driven to engage or disengage from the drive input.

Main winding section or core 24 rotates near the stator 20. An exciter rotor 26 and a permanent magnet rotor 28 provide control and safety functions, and also are associated with their own stators (not shown). Bearings 30 and 32 are placed on opposed axial ends of the main winding section 24.

A drive input 300 is shown in phantom in FIG. 1 and a yoke 301 is shown schematically. The yoke 301 operates to cam surfaces on the clutch member 22 toward and away from the drive input 300 such that drive can be selectively transmitted. Aspects of the clutch member, the yoke and the drive input are found in co-pending patent application Ser. No. 12/436,159, filed on even date herewith, and entitled "Decoupler Shaft for High Speed Generator" and owned by the assignee of this application and "High Speed Clutch Design with Jaw Tooth Profile to Reduce Separating Load," assigned Ser. No. 12/436,168, filed on even date herewith, and assigned to the assignee of the present invention. In addition, a rotor gear which is driven by the rotor shaft is disclosed in co-pending patent application Ser. No. 12/436,190, filed on even date herewith, and entitled "Rotor Gear for a Generator." This rotor gear serves to assist in driving an oil pump for delivering oil to components within the generator. In addition, a permanent magnet rotor is attached to the rotor shaft in a manner disclosed below, but further disclosed in detail in a co-pending patent application Ser. No. 12/436,164, filed on even date herewith, and entitled "Axial Retention of Permanent Magnet Rotor in High Speed Generator."

Figure 2:
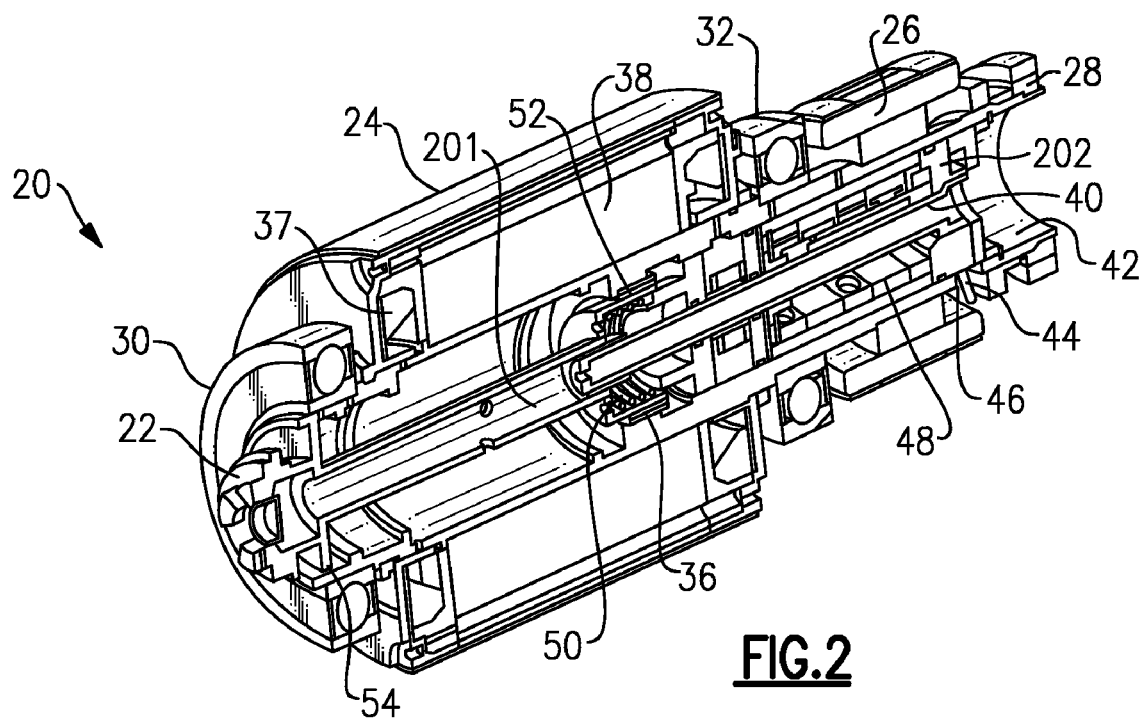
FIG. 2 is a cross-sectional view through the FIG. 1 generator.

FIG. 2 shows bearings 30 and 32 mounted at each end of the main winding section 24. Windings 37 and laminations 38 are received within this main winding section 24.

An enlarged portion 54 of the clutch member 22 is a close fit within an inner diameter of a rotor shaft 42. Spline 52/36 supports the opposite end of the inner diameter shaft. A rectifier assembly 48 is shown schematically, and is positioned within a bore in the rotor shaft 42. An element 40 is an oil distribution transfer tube which provides oil to the disconnect shaft or clutch member 22. The oil may then be distributed to the rotor shaft. As can be seen, the oil tube 40 is received within an inner diameter 201 of the clutch member 22.

Spline teeth 52 are formed at an axially intermediate portion of the inner bore of the shaft 42, and mate with spline teeth 36 on the clutch member 22. A spring 50 biases the clutch member 22 outwardly, and against the input shaft 300.

Generally, a bar is machined by a lathe to include the basic shape of the rotor shaft 42. Teeth 52 are formed at an internal surface by some machining process, and in one embodiment, a broaching operation. The intermediate member is then heat treated and final machined.

A wire 44 communicates from the exciter rotor 26 to the rectifier assembly 48, and extends through slots 46 in the shaft 42.

A method of replacing a generator rotor shaft into a generator includes the steps of moving the rotor shaft 42 such that a central portion 105 supports a main winding section of the generator, and such that smaller diameter portions 104 and 106 are supported by bearings, and moving a wire through slots in the shaft, and utilizing the wire to connect a rectifier assembly to an exciter rotor.

FIG. 3A is a cross-sectional view through the shaft 42. As shown, surfaces 104 and 106 are formed to be at a smaller diameter relative to a central portion 105, which supports the main winding section 24. The bearings 30 and 32 are received on surfaces 104 and 106. Slots 46 are shown to include a plurality of slots, which are circumferentially spaced. As can be seen, a ledge 102 is positioned slightly axially inwardly from the end 111. This ledge will provide a stop for the clutch member 34 when the generator is selectively disengaged.

An end 111 of the shaft, which receives the clutch member 34, is spaced from an opposed end 110 by a first distance d0. The end of each spline 52 is spaced from the end 111 by a second distance d1. The spline 52 extends over a third distance d2.

Lubrication holes 107 are spaced along the rotor shaft 42.

In one embodiment, the distance d0 was 12.441" (316.00 mm), the distance d1 was 5.835 (148.2 mm) the distance d2 was 0.635" (16.1 mm).

A ratio of d1 to d0 is preferably between 0.3 and 0.6, and more preferably, 0.4 and 0.5. The ratio of d2 to d1 is preferably between 0.1 and 0.125.

As can be best seen in FIG. 3B, at end 110, there are screw threads 500, and a piloting diameter 502. As disclosed in the above-referenced U.S. patent application entitled "Axial Retention of Permanent Magnet Rotor in High Speed Generator," the permanent magnet motor has threads which mate with threads 500, and a pilot surface that pilots on surface 502. These portions of the above-referenced application are incorporated herein by reference. As can be appreciated from FIG. 3B, a first diameter D1 to the root of the screw thread teeth is defined, as is a second diameter D2 to the tip of the screw thread teeth. A third diameter D3 is defined to the outer diameter of the pilot surface 502. Although not shown as diameters in FIG. 3B, it should be appreciated that these are diameters. In one embodiment, the diameter D1 is between 1.8730" (47.574 mm) and 1.8798" (47.746 mm). The diameter D2 is between 1.9294" (49.007 mm) and 1.9375" (49.212 mm) and the diameter D3 is between 2.0165" (51.219 mm) and 2.0160" (51.20 mm). In embodiments, a ratio of D3 to D1 between 1.07 and 1.08.

In one embodiment, the screw threads were 20 threads per inch. A self-locking thread available under the trade name Spiralok was used on the permanent magnet rotor.

As shown in FIG. 4, the slots 46 are circumferentially spaced. The slots preferably extend over more than 180° of the circumference of the shaft 42 at that location. In embodiments, the slots may extend over more than 270°.

Figure 5:
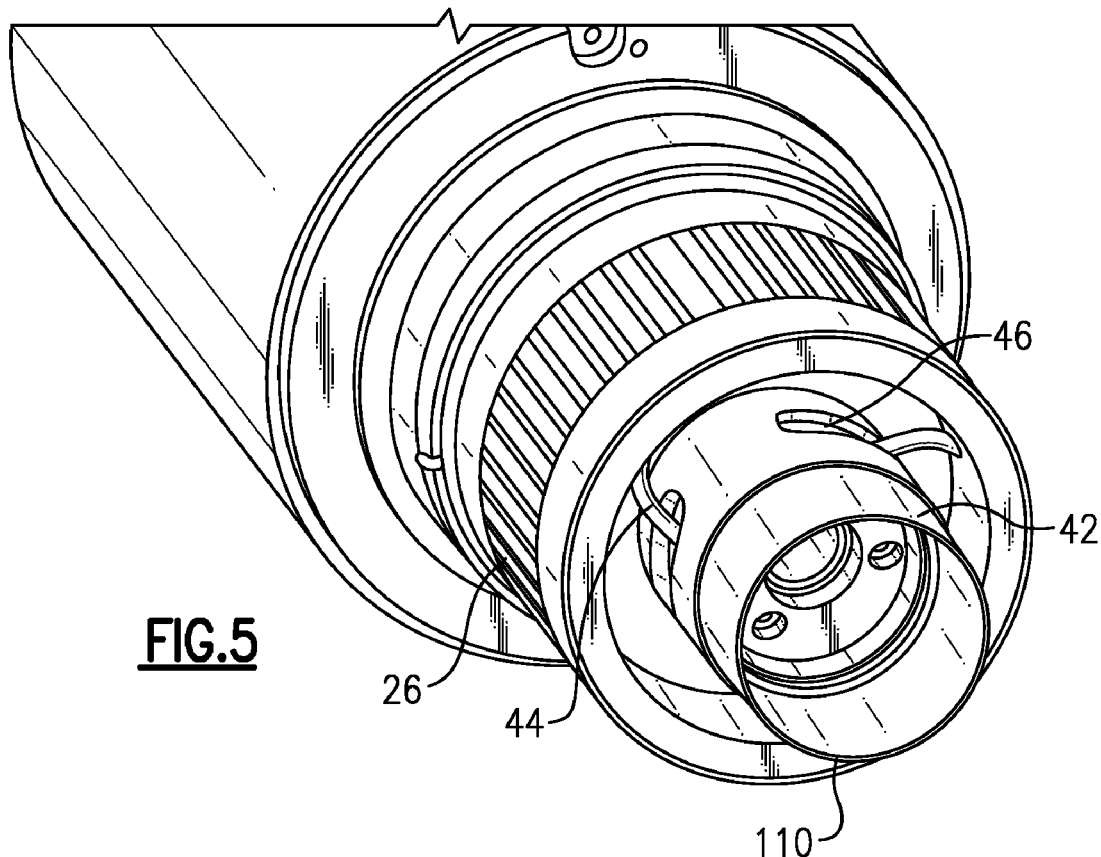
FIG. 5 is an end view of a generator.

FIG. 5 is an end view of the shaft 42 showing the slots 46 and the wires 44 passing into the shaft 42. Note the threads 500 are eliminated from the view for illustration simplicity.

Figure 6:
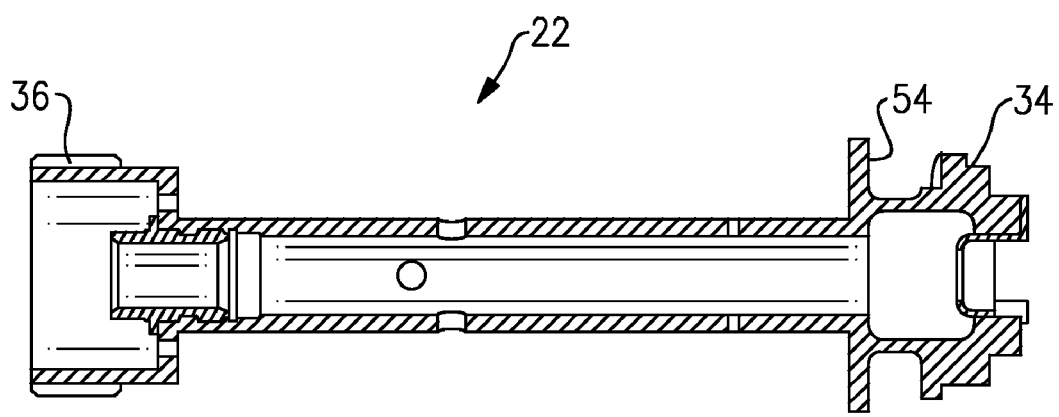
FIG. 6 shows a clutch member incorporated into the generator.

FIG. 6 shows the clutch member 22 having splines 36 at one end, the portion 54 that is to be tightly received within end 111. Teeth at the opposed end selectively engage teeth on the input shaft 300.

The rotor shaft as disclosed and claimed in this application provides several benefits, including providing freedom as to the location of the exciter rotor, and to further allow a disconnect clutch shaft to have a length that is at a more optimal dimension relative to the prior art. In addition, a worker of ordinary skill in the art would appreciate many other benefits from the disclosed application.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A generator rotor shaft comprising:
 a shaft body extending through a first axial distance, and being hollow; and
 spline teeth formed on an inner bore of said body, a ratio of a distance from one axial end of said body to a remote axial end of said spline teeth, to the first axial distance, being between 0.3 and 0.6.

2. The generator rotor shaft as set forth in claim 1, wherein said body is formed with a ledge spaced axially inwardly from said one end, and providing a stop for a clutch member to be received within said body.

3. The generator rotor shaft as set forth in claim 1, wherein a ratio of an axial length of said spline teeth to said distance from said one end to said remote axial end of said spline teeth being between 0.1 and 0.125.

4. The generator rotor shaft as set forth in claim 1, wherein there are slots within said rotor shaft spaced axially inwardly of a second end of said body, said slots for allowing passage of wire from a radially outer portion of said body to a radially inner portion of said body, said slots extending for more than 180° about a central axis of said body.

5. The generator rotor shaft as set forth in claim 1, wherein a larger diameter portion of an outer periphery of said body is provided for supporting main windings of a generator, and there being smaller diameter portions on each axial side of said larger diameter portion for supporting bearings.

6. The generator rotor shaft as set forth in claim 1, wherein the ratio of the distance from said one axial end of said body to said remote axial end of said spline teeth, to the first axial distance, being between 0.4 and 0.5.

7. The generator rotor shaft as set forth in claim 1, wherein screw threads are formed at a remote axial end of said body to receive a permanent magnet rotor.

8. A rotor balance assembly for a generator comprising:
 a main winding section mounted on an outer periphery of a rotor shaft; and
 said rotor shaft including a shaft body extending through a first axial distance, and being hollow, spline teeth formed on an inner bore of said body, a ratio of a distance from one axial end of said body to a remote axial end of said spline teeth, to the first axial distance, being between 0.3 and 0.6.

9. The generator as set forth in claim 8, wherein a support shaft is inserted within a hollow bore in a clutch member, and extends beyond said clutch member and towards a second axial end of said body.

10. The rotor balance assembly as set forth in claim 8, wherein a ratio of an axial length of said spline teeth to said distance from said one end to said remote axial end of said spline teeth being between 0.1 and 0.125.

11. The rotor balance assembly as set forth in claim 8, wherein there are slots within said rotor shaft spaced axially inwardly of a second axial end of said body, an exciter rotor mounted on said body, a rectifier mounted within said body, and a wire from said exciter rotor connected to said rectifier, and passing through at least one of said slots, said slots extending for over 180° of a circumferential distance about a central axis of said rotor shaft.

12. The rotor balance assembly as set forth in claim 8, wherein a larger diameter portion of an outer periphery of said body supports said main winding section, and there being smaller diameter portions on each axial side of said larger diameter portion, and each supporting a bearing.

13. The rotor balance assembly as set forth in claim 8, wherein the ratio of the distance from said one axial end of said body to said remote axial end of said spline teeth, to the first axial distance, being between 0.4 and 0.5.

14. A generator comprising:
a stator;
a main winding section mounted to a rotor shaft for rotation adjacent to said stator; and
said rotor shaft including a shaft body extending through a first axial distance, and being hollow, spline teeth formed on an inner bore of said body, a ratio of a distance from one end of said body to a remote axial end of said spline teeth, to the first axial distance, being between 0.3 and 0.6.

15. The generator as set forth in claim 14, wherein a support shaft is inserted within a hollow bore in a clutch member, and extends beyond said clutch member and towards a second axial end of said body.

16. The generator as set forth in claim 14, wherein a ratio of an axial length of said spline teeth to said distance from said one end to said remote axial end of said spline teeth being between 0.1 and 0.125.

17. The generator as set forth in claim 14, wherein there are slots within said rotor shaft spaced axially inwardly of a second axial end of said body, an exciter rotor mounted on said body, a rectifier mounted within said body, and a wire from said exciter rotor connected to said rectifier, and passing through at least one of said slots, said slots extending for over 180° of a circumferential distance about a central axis of said rotor shaft.

18. The generator as set forth in claim 14, wherein a larger diameter portion of an outer periphery of said body supports said main winding, and there being smaller diameter portions on each axial side of said larger diameter portion, and each supporting a bearing.

* * * * *